US012658950B1

(12) United States Patent
Madsen et al.

(10) Patent No.: US 12,658,950 B1
(45) Date of Patent: Jun. 16, 2026

(54) FLEXIBLE ONLINE LOFT COMPENSATION IN RF COMMUNICATION SYSTEMS AND DEVICES

(71) Applicant: Qorvo Texas, LLC., Richardson, TX (US)

(72) Inventors: Kristian N. Madsen, Napa, CA (US); Chun Cheng Wang, San Diego, CA (US); Lewis N. Cohen, San Diego, CA (US)

(73) Assignee: Qorvo Texas, LLC., Richardson, TX (US)

( * ) Notice: Subject to any disclaimer, the term of this patent is extended or adjusted under 35 U.S.C. 154(b) by 575 days.

(21) Appl. No.: 18/094,764

(22) Filed: Jan. 9, 2023

Related U.S. Application Data

(60) Provisional application No. 63/298,748, filed on Jan. 12, 2022.

(51) Int. Cl.
H04B 1/04 (2006.01)
H04B 1/30 (2006.01)
(52) U.S. Cl.
CPC ............. H04B 1/0475 (2013.01); H04B 1/30 (2013.01)
(58) Field of Classification Search
CPC ............................... H04B 1/0475; H04B 1/30

USPC .................. 455/114.2, 91, 115.1; 324/76.11; 340/653
See application file for complete search history.

(56) References Cited

U.S. PATENT DOCUMENTS

| | | | |
|---|---|---|---|
| 9,577,685 B1* | 2/2017 | Mirzaei ................ | H04B 1/0475 |
| 2006/0094395 A1* | 5/2006 | Lee .......................... | H04B 1/30 |
| | | | 455/284 |
| 2007/0025433 A1* | 2/2007 | Hammerschmidt ... | H04B 17/21 |
| | | | 375/224 |
| 2008/0139139 A1* | 6/2008 | Pan ........................ | H04B 1/525 |
| | | | 455/114.2 |
| 2013/0287076 A1* | 10/2013 | Afsahi .................. | H03F 1/0222 |
| | | | 375/221 |
| 2018/0062274 A1* | 3/2018 | Madsen ............... | H04B 7/0617 |
| 2019/0312330 A1* | 10/2019 | Madsen ............... | H01Q 3/2605 |
| 2019/0356057 A1* | 11/2019 | Carey ................... | H01Q 1/241 |
| 2020/0350677 A1* | 11/2020 | Jain ...................... | H01Q 3/2617 |
| 2022/0247433 A1* | 8/2022 | Perumana ............ | H04B 17/345 |
| 2022/0416822 A1* | 12/2022 | Azadet ................. | H04B 1/0475 |

* cited by examiner

*Primary Examiner* — Juan A Torres
(74) *Attorney, Agent, or Firm* — Fish & Richardson P.C.

(57) ABSTRACT

A flexible online local oscillator feed-through (LOFT) compensation system and method involves analyzing an output of an RF transmitter in each of a number of unused durations of a radio communication protocol to characterize local oscillator feed-through (LOFT) components in the transmitter output and adjusting the RF transmitter to compensate for the LOFT components based on the characterization.

19 Claims, 8 Drawing Sheets

FLEXIBLE ONLINE LOFT COMPENSATION IN RF COMMUNICATION SYSTEMS AND DEVICES

CROSS-REFERENCE TO RELATED APPLICATION(S)

This patent application claims the benefit of U.S. Provisional Patent Application No. 63/298,748 entitled FLEXIBLE ONLINE LOFT COMPENSATION IN RF COMMUNICATION SYSTEMS AND DEVICES filed Jan. 12, 2022, which is hereby incorporated herein by reference in its entirety.

The subject matter of this patent application may be related to the subject matter of one or more of the following patent applications, each of which is hereby incorporated herein by reference in its entirety:

U.S. patent application Ser. No. 18/094,771 filed on even date herewith, which claims the benefit of U.S. Provisional Patent Application No. 63/298,753 entitled FLEXIBLE CALIBRATION OF TIME-VARYING OPERATING PARAMETERS IN RF COMMUNICATION SYSTEMS AND DEVICES filed Jan. 12, 2022;

U.S. patent application Ser. No. 18/094,779 filed on even date herewith, which claims the benefit of U.S. Provisional Patent Application No. 63/298,756 entitled ARRAY SELF-CALIBRATION filed Jan. 12, 2022;

U.S. patent application Ser. No. 18/094,791 filed on even date herewith, which claims the benefit of U.S. Provisional Patent Application No. 63/298,758 entitled INTEGRATED SINGLE-CHIP BEAMFORMING SYSTEM filed Jan. 12, 2022.

FIELD OF THE INVENTION

The invention generally relates to local oscillator feed-through (LOFT) compensation in radio frequency (RF) communication systems and devices.

BACKGROUND OF THE INVENTION

A local oscillator (LO) is often used with a mixer to change the frequency of a signal in radio frequency (RF) communication devices/systems such as 5G communication devices/systems. Local oscillator feed-through (LOFT) is a well-known problem in such devices/systems, where unwanted LO components show up in the output of a transmitter circuit. LOFT compensation is currently performed with the RF device/system "offline" (i.e., not during transmission or reception of communication signals such as 5G signals) and generally involves connecting the transmitter circuit output to a LOFT compensation system (which in some RF communication devices/systems can include a receiver circuit of a transceiver device/system that is connected to the transmitter circuit output through a feedback or loopback connection), causing the transmitter circuit to transmit a number of successive test signals (e.g., N test symbols having predetermined characteristics such as frequency, amplitude, etc.), and operating the LOFT compensation system to measure LOFT components in received signals and to adjust the transmitter circuit based on such measurements to compensate (e.g., reduce or cancel) the LOFT components. Such LOFT compensation may be done, for example, during initial device/system calibration (e.g., during manufacturing/certification) or at device/system startup or reboot prior to taking the device/system "online." One problem with LOFT is that LOFT characteristics and LOFT compensation parameters can vary over time, e.g., due to environmental changes such as temperature, voltage, etc. Thus, in order to compensate for such time-varying LOFT, the RF communication device/system generally would need to be taken offline from time to time so that the LOFT measurement and compensation operations can be performed from time to time. Such offline modes may be disruptive or unpermitted in some communication systems. It should be noted that LOFT compensation is often referred to as calibration, e.g., when performed during manufacturing or at startup or reboot, or re-calibration, e.g., when performed after a startup or reboot.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires:

A "set" includes one or more members.

A "beam forming element" (sometimes referred to simply as an "element" or "radiating element") is an element that is used to transmit and/or receive a signal for beam forming. Different types of beam forming elements can be used for different beam forming applications. For example, the beam forming elements may be RF antennas for RF applications (e.g., radar, wireless communication system such as 5G applications, satellite communications, etc.), ultrasonic transducers for ultrasound applications, optical transducers for optical applications, microphones and/or speakers for audio applications, etc. Typically, the signal provided to or from each beam forming element is independently adjustable, e.g., as to gain/amplitude and phase.

A "beam-formed signal" is a signal produced by or from a plurality of beam forming elements. In the context of the present invention, there is no requirement that a beam-formed signal have any particular characteristics such as directionality or coherency.

A "phased array system" is a system that includes a plurality of beam forming elements and related control logic for producing and adapting beam-formed signals.

For convenience, the term "beam forming" is sometimes abbreviated herein as "BF."

Various embodiments are described herein in the context of active electronically steered antenna (AESA) systems also called Active Antenna, although the present invention is in no way limited to AESA systems. AESA systems form electronically steerable beams that can be used for a wide variety of applications. Although certain details of various embodiments of an AESA system are discussed below, those skilled in the art can apply some embodiments to other AESA systems. Accordingly, discussion of an AESA system does not necessarily limit certain other embodiments.

Figure 1:
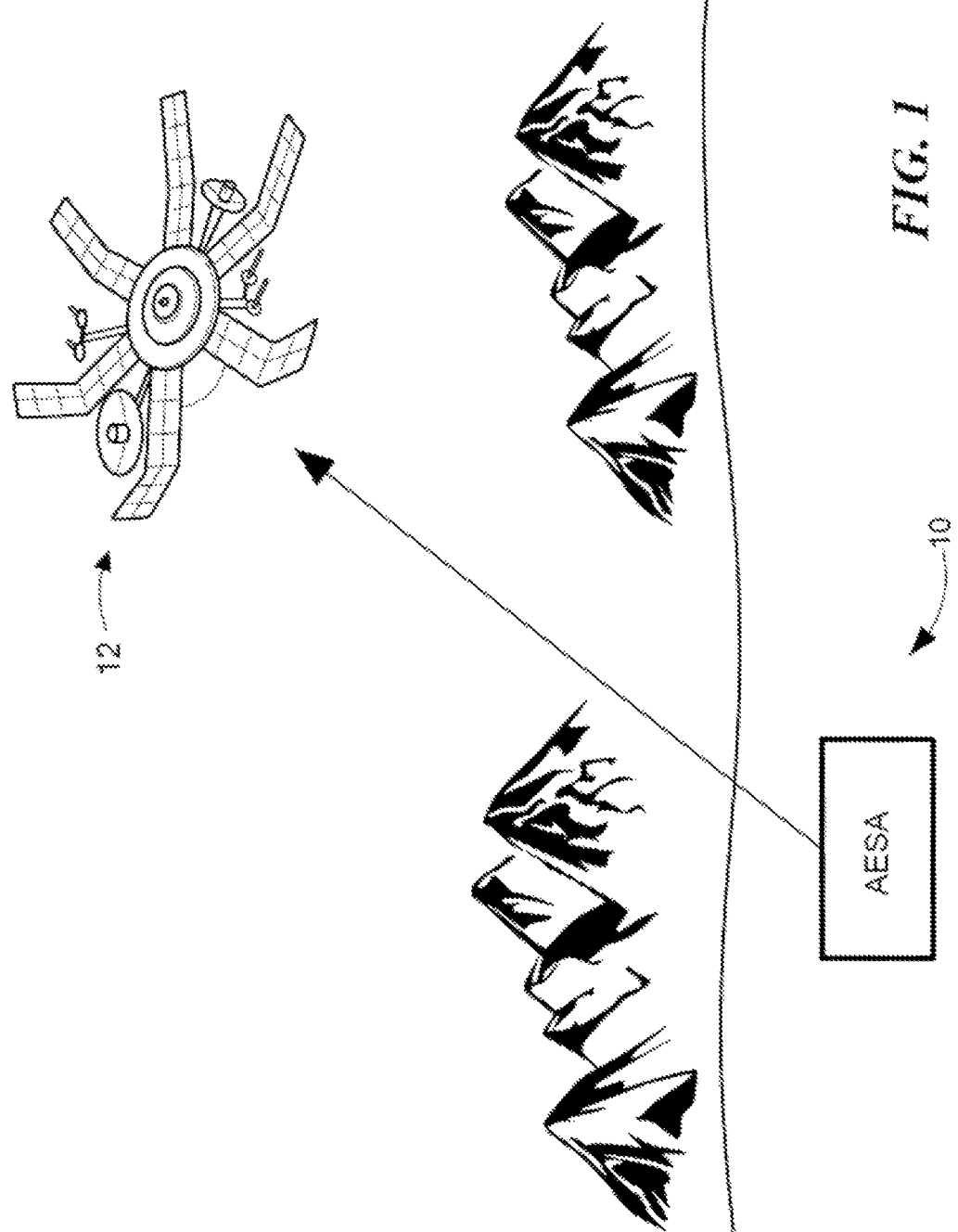
FIG. 1 schematically shows an active electronically steered antenna system ("AESA system") configured in accordance with certain illustrative embodiments of the invention and communicating with an orbiting satellite.

FIG. 1 schematically shows an active electronically steered antenna system ("AESA system 10") configured in accordance with certain illustrative embodiments of the invention and communicating with an orbiting satellite 12. A phased array (discussed in more detail below and referenced as phased array 10A) implements the primary functionality of the AESA system 10. Specifically, as known by those skilled in the art, the phased array forms one or more of a plurality of electronically steerable beams that can be used for a wide variety of applications. As a satellite communication system, for example, the AESA system 10, preferably is configured operate at one or more satellite frequencies. Among others, those frequencies may include the Ka-band, Ku-band, and/or X-band. Of course, as satellite communication technology progresses, future implementations may modify the frequency bands to communicate using new satellite frequencies.

Figure 2:
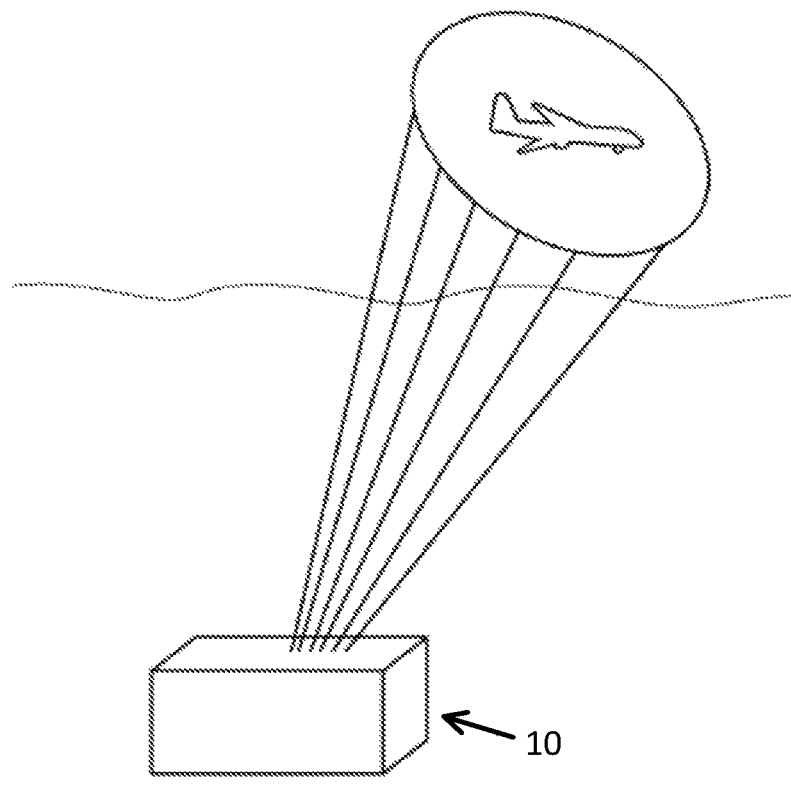
FIG. 2 schematically shows an AESA system configured in accordance with certain illustrative embodiments of the invention and implemented as a radar system in which a beam-formed signal may be directed toward an aircraft or other object in the sky (e.g., to detect or track position of the object).

FIG. 2 schematically shows an AESA system 10 configured in accordance with certain illustrative embodiments of the invention and implemented as a radar system in which a beam-formed signal may be directed toward an aircraft or other object in the sky (e.g., to detect or track position of the object).

Figure 3:
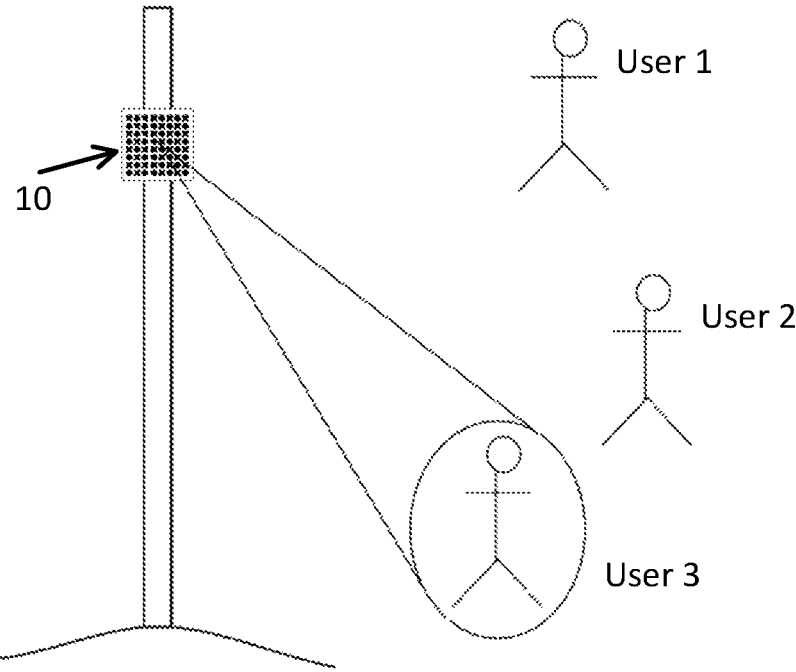
FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells).

FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells). Of course, other implementations may include other types of wireless communication systems.

Of course, those skilled in the art use AESA systems 10 and other phased array systems in a wide variety of other applications, such as RF communication, optics, sonar, ultrasound, etc. Accordingly, discussion of satellite, radar, and wireless communication systems are not intended to limit all embodiments of the invention.

The satellite communication system may be part of a cellular network operating under a known cellular protocol, such as the 3G, 4G (e.g., LTE), or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

In certain exemplary embodiments, the beam forming elements may be implemented as patch antennas that are formed on one side of a laminar printed circuit board, although it should be noted that the present invention is not limited to patch antennas or to a laminar printed circuit board. In exemplary embodiments, a phased array includes X beam forming integrated circuits (BFICs), with each BFIC supporting Y beam forming elements (e.g., 2 or 4 beam forming elements per BFIC, although not limited to 2 or 4). Thus, such a phased array includes (X*Y) beam forming elements.

Figure 4:
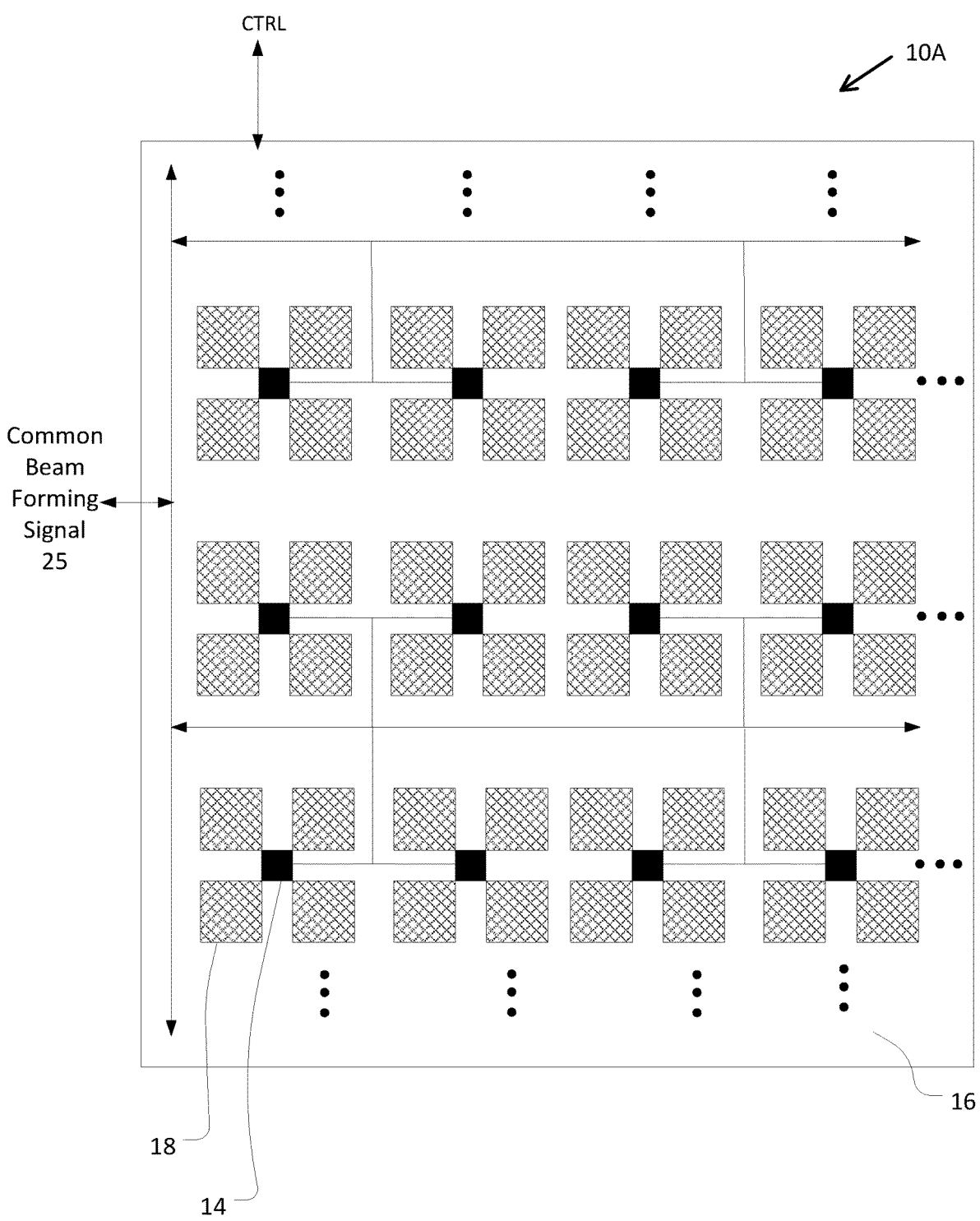
FIG. 4 schematically shows a plan view of a primary portion of an AESA system in which each beam forming integrated circuit (BFIC) is connected to four beam forming elements, in accordance with illustrative embodiments of the invention.
Figure 5:
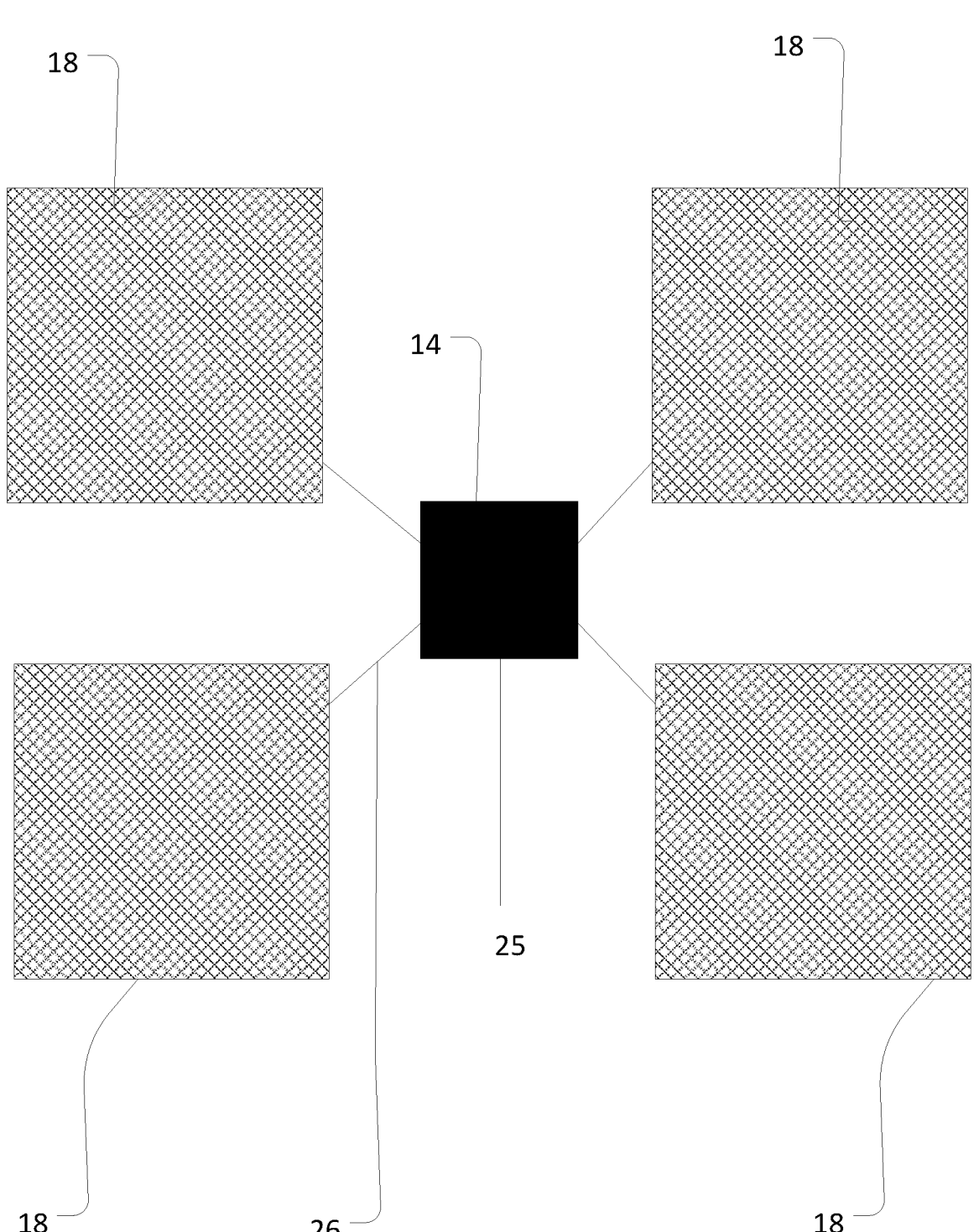
FIG. 5 schematically shows a close-up of a portion of the phased array of FIG. 4.

FIG. 4 schematically shows a plan view of a primary portion of an AESA system 10 in which each beam forming integrated circuit 14 is connected to four beam forming elements 18, in accordance with illustrative embodiments of the invention. Each BFIC 14 aggregates signals to/from the connected beam forming elements as part of a common beam forming signal 25. FIG. 5 schematically shows a close-up of a portion of the phased array 10A of FIG. 4.

Specifically, the AESA system 10 of FIG. 4 is implemented as a laminar phased array 10A having a laminated printed circuit board 16 (i.e., acting as the substrate and also identified by reference number "16") supporting the above noted plurality of beam forming elements 18 and beam forming integrated circuits 14. The elements 18 preferably are formed as a plurality of square or rectangular patch antennas oriented in a patch array configuration. It should be noted that other embodiments may use other patch configurations, such as a triangular configuration in which each integrated circuit is connected to three elements 18, a pentagonal configuration in which each integrated circuit is connected to five elements 18, or a hexagonal configuration in which each integrated circuit is connected to six elements 18. Like other similar phased arrays, the printed circuit board 16 also may have a ground plane (not shown) that electrically and magnetically cooperates with the elements 18 to facilitate operation. In exemplary embodiments, the BFICs are mounted to a back side of the printed circuit board opposite the side containing the patch antennas (e.g., with through-PCB vias and traces that connect to the elements 18, with such connections typically made using impedance controlled lines and transitions), although in alternative embodiments, the BFICs may be mounted to the same side of the printed circuit board as the patch antennas.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional semiconductor fabrication processes, such as by depositing one or more successive metal layers on the printed circuit board 16. Accordingly, using such fabrication processes, each radiating element 18 in the phased array 10A should have a very low profile. It should be noted that embodiments of the present invention are not limited to rectangular-shaped elements 18 but instead any appropriate shape such as circular patches, ring resonator patches, or other shape patches may be used in other particular embodiments.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A generally can be in either a transmit mode, or a receive mode.

The AESA system 10 has a plurality of the above noted integrated circuits 14 (mentioned above with regard to FIG. 5) for controlling operation of the elements 18. Those skilled in the art sometimes refer to these integrated circuits 14 as "beam steering integrated circuits." Each integrated circuit 14 preferably is configured with at least the minimum number of functions to accomplish the desired effect. Indeed, integrated circuits 14 for dual mode (transmit and receive) elements 18 are expected to have some different functionality than that of the integrated circuits 14 for transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
   phase shifting,
   amplitude controlling/beam weighting,
   switching between transmit mode and receive mode,
   output amplification to amplify output signals to the elements 18,
   input amplification for received RF signals (e.g., signals received from the satellite 12), and
   power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches. Additional details of the structure and functionality of integrated circuits 14 are discussed below.

In illustrative embodiments, multiple elements 18 share the integrated circuits 14, thus reducing the required total number of integrated circuits 14. This reduced number of integrated circuits 14 correspondingly reduces the cost of the AESA system 10. In addition, more surface area on the top face of the printed circuit board 16 may be dedicated to the elements 18.

To that end, each integrated circuit 14 preferably operates on at least one element 18 in the array and typically operates on a plurality of elements 18. For example, as discussed above, one integrated circuit 14 can operate on two, three, four, five, six, or more different elements 18. Of course, those skilled in the art can adjust the number of elements 18 sharing an integrated circuit 14 based upon the application. For example, a single integrated circuit 14 can control two elements 18, three elements 18, four elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly reducing the required size of the printed circuit board 16 and cost of the system.

Dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms (discussed below) of the integrated circuit 14. Instead, such embodiments may duplex at the element 18. This process can be performed by isolating one of the elements 18 between transmit and receive by an orthogonal feed connection. Such a feed connection may eliminate about a 0.8 dB switch loss and improve G/T (i.e., the ratio of the gain or directivity to the noise temperature) by about 1.3 dB for some implementations.

RF interconnect and/or beam forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP) or other configuration such as extended wafer level ball-grid-array (eWLB) that supports flip chip, or a traditional package, such as quad flat no-leads package (QFN package).

It should be reiterated that although FIG. 4 shows an exemplary AESA system 10 with some specificity (e.g., specific layouts of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configurations of the AESA system 10 shown in FIG. 4 is for convenience only and not intended to limit all embodiments.

Figure 6:
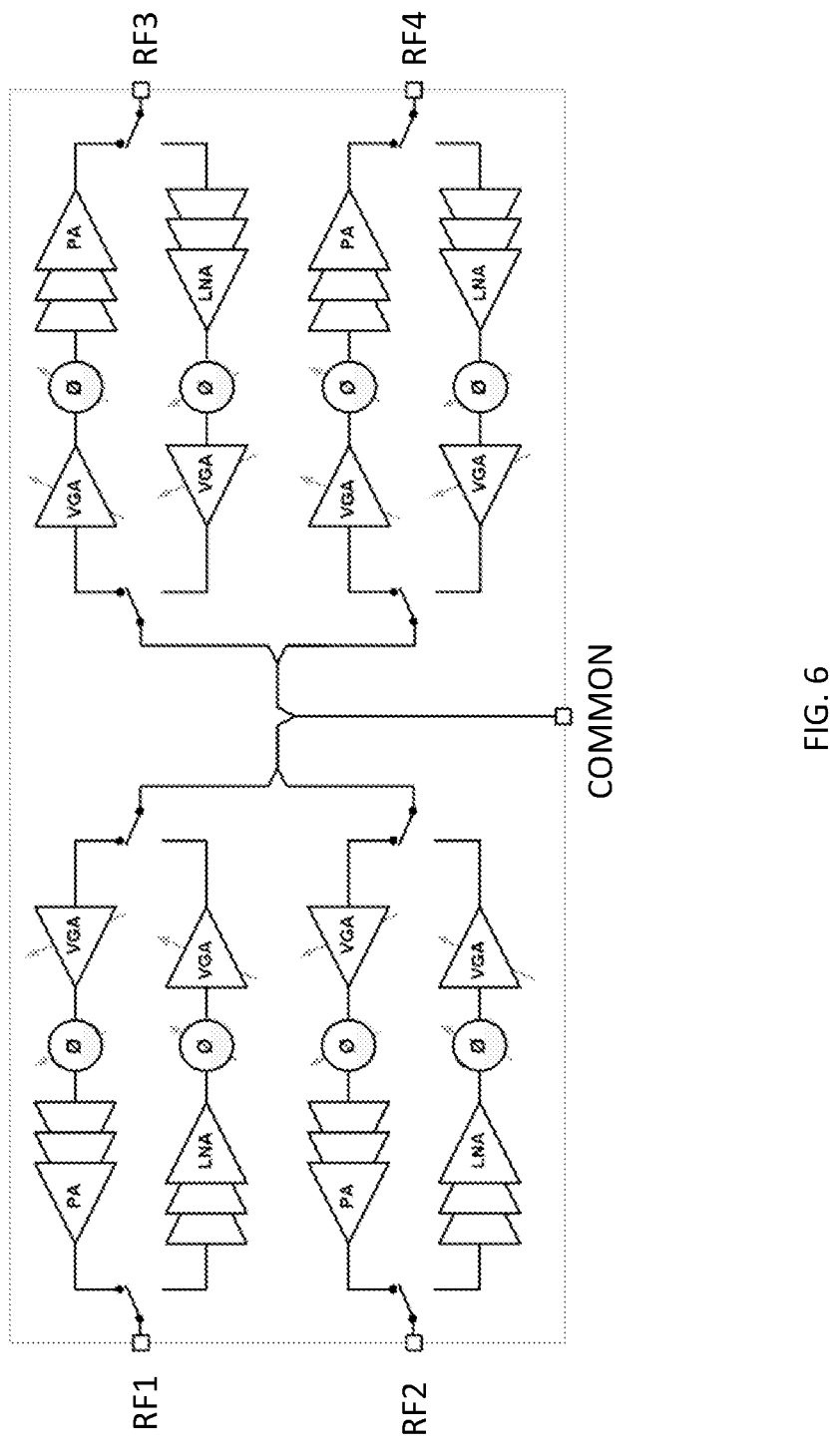
FIG. 6 is a high-level schematic diagram of a four-channel dual-mode BFIC chip in accordance with one exemplary embodiment.

FIG. 6 is a high-level schematic diagram of a four-channel dual-mode BFIC chip in accordance with one exemplary embodiment. Here, each channel has a transmit gain/phase control circuit and a receive gain/phase control circuit that can be switched into and out of the common beam forming signal 25. The transmit gain/phase control circuit includes a variable gain amplifier (VGA), an adjustable phase circuit (O), and a power amplifier (PA) stage. The receive gain/phase control circuit includes a low noise amplifier (LNA) stage, an adjustable phase circuit (O), and a variable gain amplifier (VGA). In FIG. 6, the BFIC chip is shown with the switches configured in a transmit mode, such that common beam forming signal 25 provided to the BFIC chip is distributed to the four channels. The BFIC chip can be configured in a receive mode by changing the position of the switches, such that signals received on the four channels are output by the BFIC chip as common beam forming signal 25.

Figure 7:
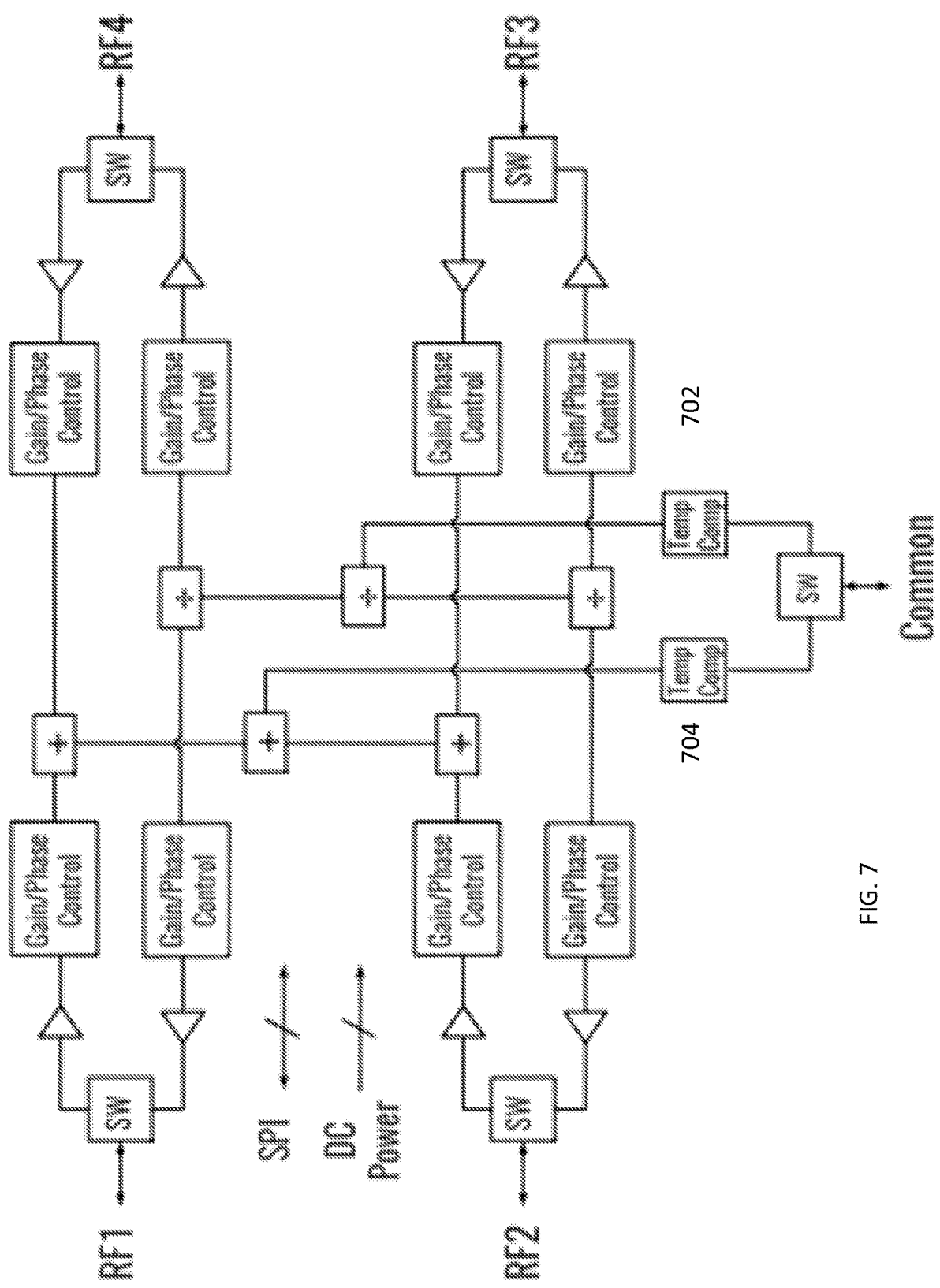
FIG. 7 is a detailed schematic diagram of the BFIC chip of FIG. 6, in accordance with one exemplary embodiment.

FIG. 7 is a detailed schematic diagram of the BFIC chip of FIG. 6, in accordance with one exemplary embodiment. In this exemplary embodiment, the BFIC chip includes temperature compensation (Temp Comp) circuitry to adjust the gain of the transmit and receive signals as a function of temperature based on inputs from a temperature sensor, although alternative embodiments may omit temperature compensation circuitry. In one exemplary embodiment, each Temp Comp circuit includes a digital attenuator that is controlled based on the sensed temperature. Specifically, in this exemplary embodiment, when temperature decreases such that the gain would increase, attenuation is increased in order provide the desired amount of gain, and when temperature increases such that gain would decrease, attenuation is decreased in order to provide the desired amount of gain. In the exemplary embodiment represented in FIG. 7, temperature compensation is performed on the transmit signal prior to distribution to the four RF channels by Temp Comp circuit 702 and is performed on the combined receive signal by Temp Comp circuit 704. In various alternative embodiments, temperature compensation may be performed in other ways, such as, for example, by controlling of the gain of the transmit and receive RF amplifiers.

Embodiments compensate for perform LOFT compensation without taking the RF communication device/system offline by intermittently monitoring the LOFT components during small flexible unused durations over a long period of time such as during a number of standby or other unused durations when no other transmit or receive operations are being performed, e.g., without disrupting RF communications of a given RF communication protocol such as 5G. For example, during a number of such standby or other unused durations, the transmitter output may be coupled to the LOFT compensation system to analyze local oscillator feedthrough components in the transmitter output and adjust (re-calibrate) the transmitter with new offsets to compensate for the then-existing LOFT characteristics. Such LOFT compensation can be performed without the transmitter transmitting any signals. In some cases, LOFT may be analyzed within a single unused duration (i.e., a single unused duration may provide a sufficient sample space for characterizing LOFT) although LOFT may be analyzed across multiple unused durations, e.g., if a single unused duration does not provide a sufficient sample space for characterizing LOFT or to determine an average LOFT over a period of time. By performing such LOFT compensation from time to time (which can include performing such LOFT compensation on an ongoing or continuous basis during operation of the RF communication device/system), the RF communication device/system can compensate for time-varying LOFT without taking the device/system offline.

Figure 8:
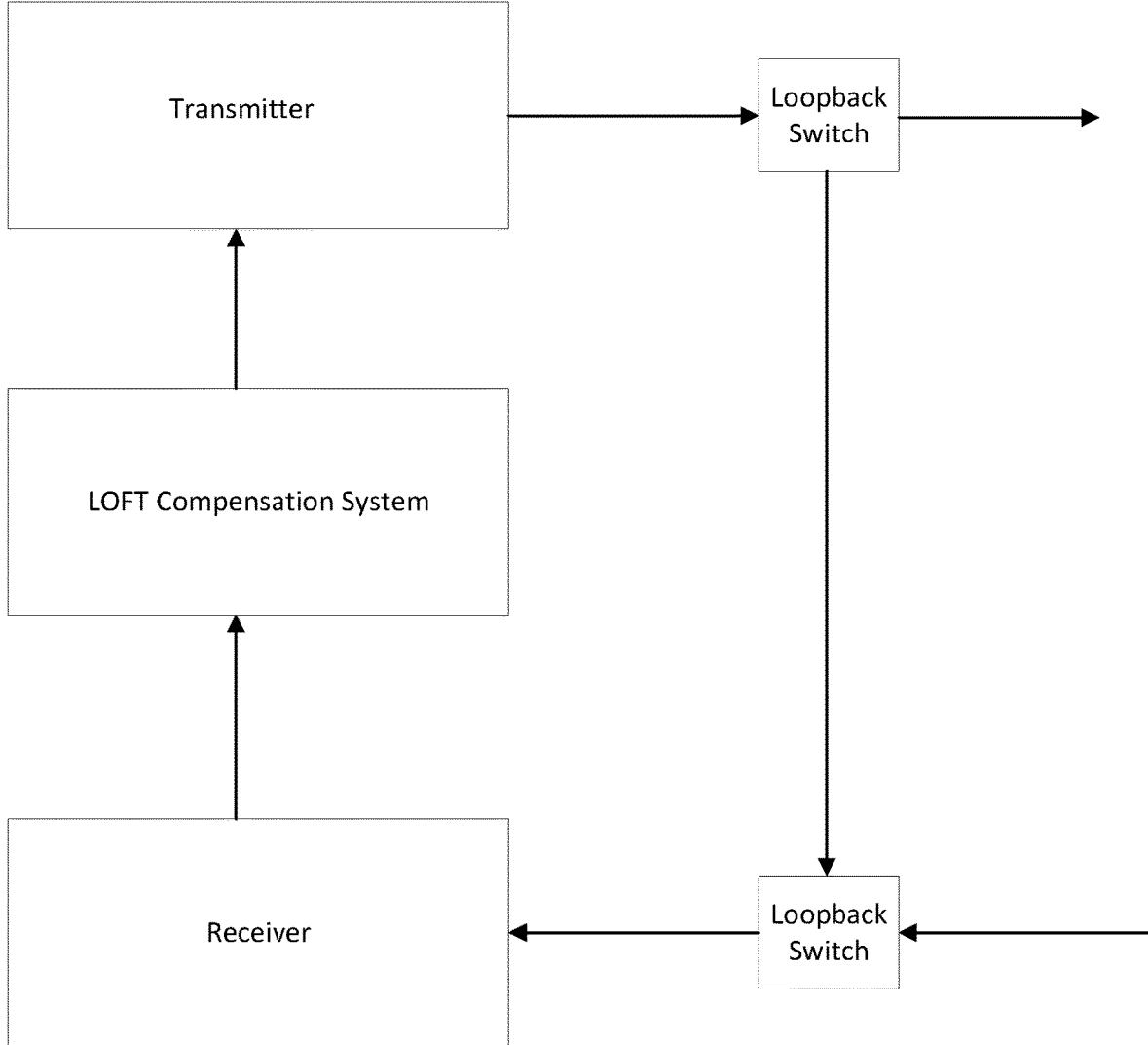
FIG. 8 is a schematic diagram showing an RF communication device/system in accordance with one exemplary embodiment.

FIG. 8 is a schematic diagram showing an RF communication device/system in accordance with one exemplary embodiment. Among other things, the RF communication device/system includes a transmitter, a receiver, and a LOFT compensation system. During unused durations when no other transmit or receive operations are being performed, the device/system may be placed in a LOFT compensation mode in which the transmitter output is coupled to the LOFT compensation system, e.g., through the receiver that can digitally sample the looped-back transmitter output and provide digital samples to the LOFT compensation system for analysis. When the LOFT compensation system has received a sufficient number of samples to characterize the LOFT, which, as discussed above, may be from one or more unused durations, then the LOFT compensation system can adjust the transmitter to compensate for the then-existing LOFT characteristics.

Figure 9:
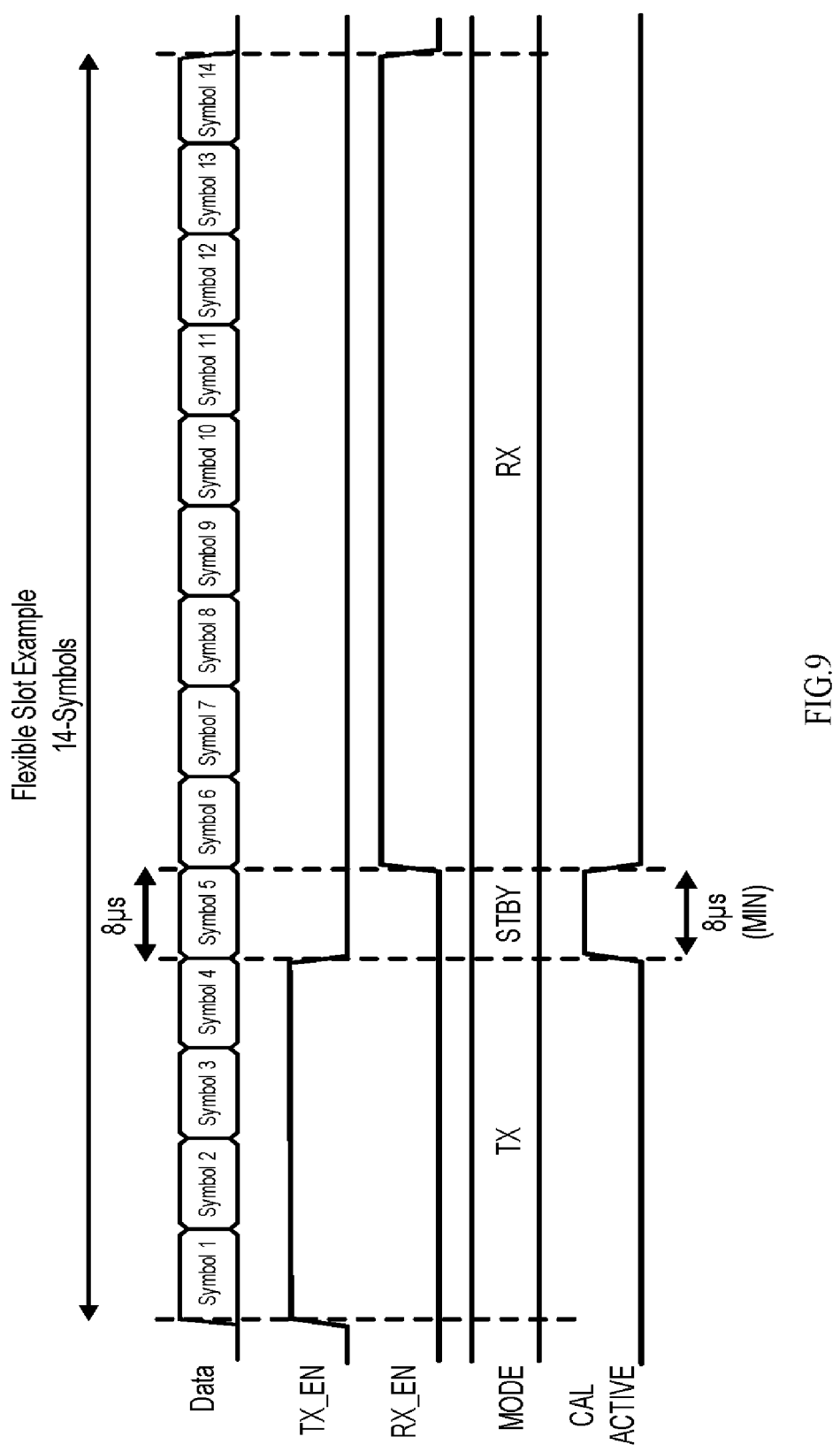
FIG. 9 shows a representation of a 14-symbol slot of the 5G protocol containing one standby symbol (i.e., unused duration) within the 14-symbol slot.

Such time-varying LOFT compensation can be used in RF communication devices/systems that utilize 5G protocols, although it should be noted that embodiments are not in any way limited to 5G protocols and can be used more generally to perform time-varying LOFT compensation in a wide range of devices/systems. In 5G, a radio frame consists of a number of subframes (e.g., 10 subframes per radio frame), with each subframe composed of a number of slots, with each slot including a number of symbols (e.g., 14 OFDM symbols per slot). FIG. 9 shows a representation of a 14-symbol slot of the 5G protocol containing one standby symbol (i.e., unused duration) within the 14-symbol slot, although it should be noted that a given 14-symbol slot can contain any combination of transmit (TX), receive (RX), and standby (STBY) symbols and different slots can contain different combinations of symbols. Thus, across a number of 14-symbol slots, there may be different numbers of standby symbols (i.e., unused durations) available to be used for LOFT compensation, and these flexible symbols are generally available randomly and for unpredictable periods of time (e.g., anywhere from 0 to 14 standby symbols per slot). Exemplary embodiments are able to operate with unused durations as short as 8 microseconds. Given these short intermittent bursts, the LOFT compensation system slowly collects the full sample space and over a long period of time can determine new offsets to compensate for LOFT.

Thus, the LOFT compensation system can use many spare 5G symbols to collect enough data to perform a re-calibration. During the time between spare symbols, the LOFT compensation algorithm is essentially frozen, and the radio goes back into "normal" operation. Due to the infrequent allocation of spare symbols, the radio is generally operated normally a majority of the time. Given enough time, the LOFT compensation system will have sampled a sufficient amount of data to determine new optimum LOFT compensation parameters. Once the new optimum is determined, it is applied and the iteration of the LOFT compensation algorithm finishes. The LOFT compensation system can be re-invoked from time to time, e.g., based on an RF communication system parameter such as detected drift, temperature change, voltage change, etc., or can be repeated periodically or run on an ongoing basis.

It should be noted that such time-varying LOFT compensation can be used in a wide range of RF communication devices/systems including, without limitation, various types of RF integrated circuits (ICs) including beamforming ICs of the type produced by Anokiwave, Inc. for 5G and other applications as well as beamforming ICs generally. Embodiments can include, without limitation, direct conversion systems as well as IF-to-I/Q conversion systems.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., LOFT compensation systems, RF integrated circuits that incorporate such LOFT compensation systems, and phased array systems that incorporate such RF integrated circuits) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/of" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A flexible online local oscillator feed-through (LOFT) compensation system of an active electronically steered antenna (AESA) of a ground station, the LOFT compensation system comprising:
   an analyzer configured to analyze an output of an RF transmitter of the AESA ground station in each of a number of unused durations of a radio communication protocol to characterize local oscillator feed-through (LOFT) components in the RF transmitter output by:
       coupling the RF transmitter output to an RF receiver of the AESA of the ground station, during the number of unused durations, wherein the number of unused durations occurs when no transmission operations of RF transmitter or reception operations of the RF receiver are being performed and the ground station is not offline;
       receiving, from the RF receiver, digital samples of the RF transmitter output; and
       characterizing the LOFT components based on the digital samples of the RF transmitter output received from the RF receiver; and
   an adjuster configured to adjust the RF transmitter to compensate for the LOFT components of the AESA of the ground station based on the characterization of the LOFT components provided by the analyzer.

2. A system according to claim 1, wherein the radio communication protocol is a 5G radio communication protocol and wherein the unused durations include standby symbols of 5G slots.

3. A system according to claim 1, wherein the analyzer is configured to determine an average LOFT across a plurality of unused durations and wherein the adjuster is configured to adjust the RF transmitter based on the average LOFT.

4. A system according to claim 1, wherein the analyzer and the adjuster are configured to analyze and adjust on an ongoing or iterative basis so as to compensate for time-varying LOFT.

5. A system according to claim 1, wherein the analyzer and the adjuster are configured to analyze and adjust upon detection of an RF communication parameter so as to compensate for time-varying LOFT.

6. A system according to claim 1, further comprising at least one beamforming element controlled by the RF transmitter.

7. The system according to claim 1, wherein the number of unused durations occurs between data symbols comprising a plurality of transmit symbols and a plurality of receive symbols in a slot of the radio communication protocol.

8. A beamforming integrated circuit of an active electronically steered antenna (AESA) of a ground station, the LOFT compensation system, the beamforming integrated circuit comprising:
   a radio frequency (RF) transmitter configured to run a radio communication protocol;

an analyzer configured to analyze an output of the RF transmitter of the AESA ground station in each of a number of unused durations of the radio communication protocol to characterize local oscillator feed-through (LOFT) components in the RF transmitter output by:

coupling the RF transmitter output to an RF receiver of the AESA of the ground station, during the number of unused durations, wherein the number of unused durations occurs when no transmission operations of RF transmitter or reception operations of the RF receiver are being performed and the ground station is not offline;

receiving, from the RF receiver, digital samples of the RF transmitter output; and characterizing the LOFT components based on the digital samples of the RF transmitter output received from the RF receiver;

an adjuster configured to adjust the RF transmitter to compensate for the LOFT components of the AESA of the ground station based on the characterization of the LOFT components provided by the analyzer.

9. A beamforming integrated circuit according to claim 8, wherein the radio communication protocol is a 5G radio communication protocol and wherein the unused durations include standby symbols of 5G slots.

10. A beamforming integrated circuit according to claim 8, wherein the analyzer is configured to determine an average LOFT across a plurality of unused durations and wherein the adjuster is configured to adjust the RF transmitter based on the average LOFT.

11. A beamforming integrated circuit according to claim 8, wherein the analyzer and the adjuster are configured to analyze and adjust on an ongoing or iterative basis so as to compensate for time-varying LOFT.

12. A beamforming integrated circuit according to claim 8, wherein the analyzer and the adjuster are configured to analyze and adjust upon detection of an RF communication parameter so as to compensate for time-varying LOFT.

13. The beamforming integrated circuit of claim 8, wherein the number of unused durations occurs between data symbols comprising a plurality of transmit symbols and a plurality of receive symbols in a slot of the radio communication protocol.

14. A flexible online local oscillator feed-through (LOFT) compensation method of an active electronically steered antenna (AESA) of a ground station, the LOFT compensation method comprising:

analyzing an output of a radio frequency (RF) transmitter in each of a number of unused durations of a radio communication protocol to characterize local oscillator feed-through (LOFT) components in the RF transmitter output comprising:

coupling the RF transmitter output to an RF receiver of the AESA of the ground station, during the number of unused durations, wherein the number of unused durations occurs when no transmission operations of RF transmitter or reception operations of the RF receiver are being performed and the ground station is not offline;

receiving, from the RF receiver, digital samples of the RF transmitter output; and characterizing the LOFT components based on the digital samples of the RF transmitter output received from the RF receiver; and adjusting the RF transmitter to compensate for the LOFT components of the AESA ground station based on the characterization of the LOFT components during the analyzing.

15. A method according to claim 14, wherein the radio communication protocol is a 5G radio communication protocol and wherein the unused durations include standby symbols of 5G slots.

16. A method according to claim 14, wherein analyzing the output comprises determining an average LOFT across a plurality of unused durations and wherein adjusting the RF transmitter comprises adjusting the RF transmitter based on the average LOFT.

17. A method according to claim 14, wherein the analyzing and adjusting are performed on an ongoing or iterative basis so as to compensate for time-varying LOFT.

18. A method according to claim 14, wherein the analyzing and adjusting is performed upon detection of an RF communication parameter so as to compensate for time-varying LOFT.

19. The method according to claim 14, wherein the number of unused durations occurs between data symbols comprising a plurality of transmit symbols and a plurality of receive symbols in a slot of the radio communication protocol.

\* \* \* \* \*